(12) United States Patent
Farnworth et al.

(10) Patent No.: US 7,094,117 B2
(45) Date of Patent: Aug. 22, 2006

(54) ELECTRICAL CONTACTS WITH DIELECTRIC CORES

(75) Inventors: Warren M. Farnworth, Nampa, ID (US); William M. Hiatt, Eagle, ID (US); Charles M. Watkins, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/788,941

(22) Filed: Feb. 27, 2004

(65) Prior Publication Data

US 2005/0191913 A1    Sep. 1, 2005

(51) Int. Cl.
*H01R 9/24* (2006.01)
*H01R 13/02* (2006.01)

(52) U.S. Cl. .................. 439/886; 439/862; 438/127
(58) Field of Classification Search ................ 439/886; 438/127
See application file for complete search history.

(56) References Cited

U.S. PATENT DOCUMENTS

| | | | |
|---|---|---|---|
| 4,665,492 A | 5/1987 | Masters | |
| 4,969,842 A * | 11/1990 | Davis | ............ 439/629 |
| 5,121,329 A | 6/1992 | Crump | |
| 5,134,569 A | 7/1992 | Masters | |
| 5,141,680 A | 8/1992 | Almquist et al. | |
| 5,173,220 A | 12/1992 | Reiff et al. | |
| 5,216,616 A | 6/1993 | Masters | |
| 5,260,009 A | 11/1993 | Penn | |
| 5,264,061 A | 11/1993 | Juskey et al. | |
| 5,340,433 A | 8/1994 | Crump | |
| 5,476,211 A | 12/1995 | Khandros | |
| 5,484,314 A | 1/1996 | Farnworth | |
| 5,705,117 A | 1/1998 | O'Connor et al. | |
| 5,772,451 A | 6/1998 | Dozier, II et al. | |
| 5,820,014 A | 10/1998 | Dozier, II et al. | |
| 5,832,601 A | 11/1998 | Eldridge et al. | |
| 5,852,871 A | 12/1998 | Khandros | |
| 5,864,946 A | 2/1999 | Eldridge et al. | |
| 5,884,398 A | 3/1999 | Eldridge et al. | |
| 5,912,046 A | 6/1999 | Eldridge et al. | |
| 5,998,228 A | 12/1999 | Eldridge et al. | |
| 6,133,355 A | 10/2000 | Leyden et al. | |
| 6,193,923 B1 | 2/2001 | Leyden et al. | |
| 6,270,335 B1 | 8/2001 | Leyden et al. | |
| 6,305,769 B1 | 10/2001 | Thayer et al. | |
| 6,347,257 B1 | 2/2002 | Bedal et al. | |
| 6,352,668 B1 | 3/2002 | Brown et al. | |
| 6,406,531 B1 | 6/2002 | Bui et al. | |
| 6,490,496 B1 | 12/2002 | Dacey | |
| 6,492,651 B1 | 12/2002 | Kerekes | |

(Continued)

OTHER PUBLICATIONS

Todd Grim, "Stereolithography, Selective Laser Sintering and PolyJet™: Evaluating and Applying the Right Technology", Accelerated Technologies, Inc., www.atirapid.com, 2002, pp. 1-8.

(Continued)

*Primary Examiner*—Hae Moon Hyeon
(74) *Attorney, Agent, or Firm*—TraskBritt, PC

(57) ABSTRACT

An electrical contact for use with a semiconductor device, a carrier, a probe card, or another substrate includes a dielectric core and a conductive coating on at least a portion thereof. Alternatively, an electrical contact may include a plurality of adjacent, mutually adhered regions comprising conductive material. The electrical contact may be rigid or flexible and resilient. Protective structures for use with flexible resilient contacts prevent deformation of such contacts beyond their elastic limits.

60 Claims, 13 Drawing Sheets

U.S. PATENT DOCUMENTS

| | | |
|---|---|---|
| 6,508,971 B1 | 1/2003 | Leyden et al. |
| 6,524,346 B1 | 2/2003 | Farnworth |
| 6,532,394 B1 | 3/2003 | Earl et al. |
| 6,589,819 B1 * | 7/2003 | Smith et al. ................ 438/123 |
| 6,640,432 B1 * | 11/2003 | Mathieu et al. ................ 29/842 |
| 2001/0009724 A1 * | 7/2001 | Chen et al. ................ 428/607 |
| 2002/0115356 A1 * | 8/2002 | Baker et al. ................ 439/886 |

OTHER PUBLICATIONS

"PolyJet 2nd Generation Technology", Objet, www2objet.com, 4 pages.

* cited by examiner

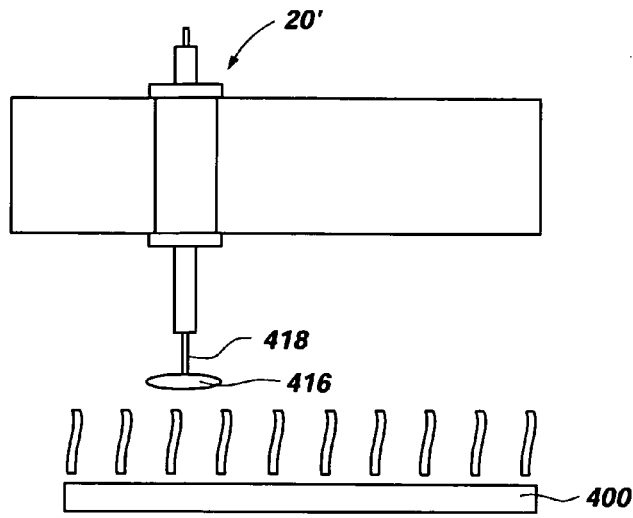
FIG. 37
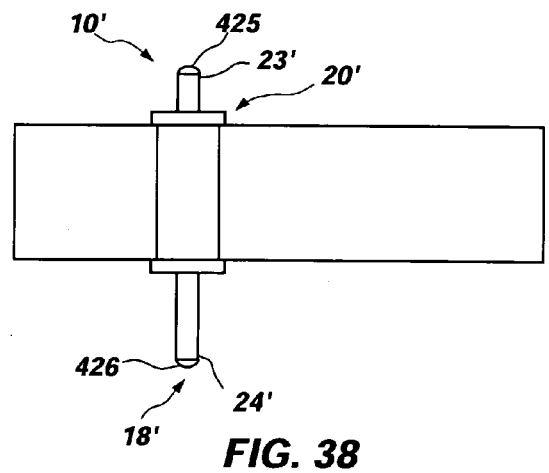
FIG. 38
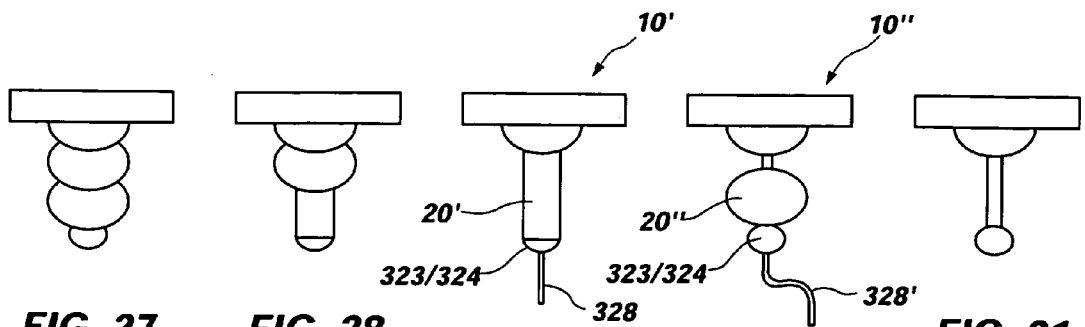
FIG. 27  FIG. 28  FIG. 29  FIG. 30  FIG. 31

ELECTRICAL CONTACTS WITH DIELECTRIC CORES

BACKGROUND OF THE INVENTION

1. Field of the Invention

The present invention relates to electrical contacts for use with semiconductor devices. The electrical contacts of the present invention may be used to provide temporary electrical connections as semiconductor devices are being burned in or otherwise tested. More specifically, the present invention relates to electrical contacts which include stereolithographically fabricated portions. The present invention also includes semiconductor devices, carriers, probe cards, and other substrates that employ such electrical contacts. Additionally, the present invention includes methods relating to fabrication of the electrical contacts of the present invention and structures incorporating same.

2. Background of Related Art

Numerous types of electrical contacts that are configured to provide temporary communication between the bond pads or other contacts of a semiconductor device and corresponding terminals or other contacts of a test substrate, carrier substrate, or other electronic component have been developed and used in the art.

Several examples of temporary electrical contacts have been developed by FormFactor, Inc., of Livermore, Calif., and are described in U.S. Pat. No. 5,476,211, as well as in other U.S. patents referenced hereinbelow that have been assigned to FormFactor (hereinafter collectively "the FormFactor Patents"). Each of these temporary electrical contacts is a compressible, resilient element which is secured to a bond pad of a semiconductor device. They may include a core and an outer coating, both of which are formed from electrically conductive materials. The core may comprise a relatively soft material, or material which is subject to plastic deformation, while the outer coating may comprise a more rigid material, which imparts the electrical contact with elastic properties. Alternatively, the core may be formed from a more rigid, elastic material, while the coating is formed from a material that enhances adhesion of the electrical contact to a bond pad of a semiconductor device.

The electrical contacts that are described in the FormFactor Patents are represented to be useful for providing temporary electrical connection between the bond pads of a semiconductor device and the contacts of a test or burn-in substrate. They may also provide permanent electrical connections between the bond pads of the semiconductor device and corresponding contacts (i.e., bond pads, terminals, leads, etc.) of another semiconductor device, a carrier, another semiconductor device component, or another electronic device.

The FormFactor Patents teach that wire-bonding apparatus may be used to form the core of an electrical contact of the type described therein, while conventional deposition or plating methods may be used to coat each core with another layer of conductive material. As conventional wire-bonding apparatus are typically configured to form only a single conductive element (e.g., bond wire, electrical contact, or other conductive structure) at a time, and since there may be thousands of bond pads on a substrate (e.g., silicon wafer) upon which numerous semiconductor devices are carried, the electrical contact fabrication processes that are described in the FormFactor Patents may be extremely and undesirably time consuming. Furthermore if, as described in the FormFactor Patents, gold is used to form the cores of numerous electrical contacts, the cost of forming the cores may be extremely and undesirably expensive.

The contacts described in the FormFactor Patents may be used, for example, in probe cards, which are used to establish a temporary connection between a semiconductor device and a test substrate or burn-in substrate. The contacts are positioned at locations that correspond to the locations of corresponding bond pads of the semiconductor device and terminals of the test substrate or burn-in substrate. Thus, the contacts are positioned so as to align between corresponding bond pads and terminals when the probe card is aligned between the semiconductor device and the test substrate or burn-in substrate. The compressibility of such contacts imparts the probe card with dimensional tolerance for the spacing between the semiconductor device and the test substrate or burn-in substrate.

Whether the Form Factor contacts are used with a probe card or another type of semiconductor device component, they may be compressed or deformed beyond their elastic limits, which will render them useless.

Accordingly, processes are needed by which electrical contacts may be more efficiently and cost-effectively fabricated, as are electrical contacts that are formed by such processes, protective structures for preventing damage to such electrical contacts, and semiconductor devices, carriers, probe cards, and other substrates with which such electrical contacts may be assembled.

SUMMARY OF THE INVENTION

The present invention, in several embodiments, includes electrical contacts, which are also referred to herein as "contacts" for simplicity, that may be at least partially fabricated by use of stereolithographic fabrication processes, as well as semiconductor devices, carriers, probe cards, and other substrates that include such contacts.

A contact, in an exemplary embodiment, includes a core which is stereolithographically formed or fabricated, as well as a conductive coating on at least a portion of the core. As the core is stereolithographically fabricated, it may include a single layer or multiple layers that are at least partially superimposed, contiguous, and mutually adhered to one another. The contact may be rigid or comprise a compressible, resilient member.

In another exemplary embodiment, a contact according to the present invention includes a conductive core disposed within a stereolithographically fabricated shell. The shell, which may include a single layer or a plurality of superimposed, contiguous, mutually adhered layers, may be formed with a channel extending therethrough. The channel may then be filled with the conductive material of the core, which is exposed at both ends of the shell.

In yet another aspect, the present invention includes methods for fabricating contacts. One exemplary embodiment of a contact fabrication method according to the present invention includes stereolithographically fabricating a core of the contact, then coating at least portions of the core with one or more layers (or sublayers) of conductive material.

A method for fabricating a contact in accordance with teachings of the present invention may include the formation of recesses within a fabrication, or sacrificial, substrate and coating the surfaces of the fabrication substrate with one or more material layers that will facilitate the subsequent release of contacts therefrom. Cores of the contacts may then be formed at the locations of the recesses, with the configuration of the base of each contact being at least partially defined by the recess within which it is formed. Thereafter, the cores may be at least partially coated with one or more layers (or sublayers) of conductive material. Once the contacts have been fabricated, they may be released from the fabrication substrate, which may then be discarded or reused to fabricate more contacts.

In another, similar embodiment of the method, the fabrication substrate may lack recesses.

In another embodiment of contact fabrication method according to the present invention, the foregoing processes may be used to form contacts that incorporate teachings of the present invention directly on the contact pads of a semiconductor device, an interposer, a carrier substrate, or the like.

Accordingly, another aspect of the present invention involves semiconductor device components that include the inventive contacts.

In another aspect, the present invention includes probe cards, which are useful in testing and burning-in semiconductor devices that include the inventive contacts. An exemplary embodiment of a probe card according to the present invention may include contact pads with one or more types of compressible, resilient electrical contacts.

In addition, methods for fabricating probe cards are within the scope of the present invention.

One embodiment of a method for fabricating a probe card may employ the above-described processes for forming contacts and, prior to releasing the contacts from the sacrificial substrate, fabricating a support plate around intermediate sections of the contacts. Accordingly, the base of each contact is located on one side of the support plate and the tip of each contact is located on the other side of the support plate. As such, the support plate is fabricated in such a way that the contacts become trapped thereby. Nonetheless, it may be possible for the contacts to move relative to the support plate, along their lengths and in a direction which is transverse to a plane in which the support plate is located. The resulting structure may comprise a probe card which is useful for testing semiconductor devices with bond pads that are arranged complementarily to the arrangement of contacts on the support plate, as well as with a test or burn-in substrate that includes terminals that are positioned correspondingly to the positions of contacts on the support plate.

Alternatively, in another embodiment, a probe card may be fabricated by forming apertures through a substrate at areas where contacts are to be located. Of course, the apertures are also positioned correspondingly to the locations of corresponding terminals of a test or burn-in substrate with which the probe card is to be used, as well as to the locations of bond pads of a semiconductor device with which the probe card is to be used. Outer shells of the contacts are then formed within the apertures and in such a way as to protrude from the opposite major surfaces of the substrate. A channel may be formed through each outer shell as that outer shell is being fabricated or following fabrication of the outer shell. Conductive material, which may be introduced into the channels or maintained in position within the apertures of the substrate while at least portions of outer shells are being fabricated, extends completely through each outer shell to form a conductive core of the corresponding contact. The conductive material is exposed at each end of the contact to facilitate connection of a bond pad of a semiconductor device with a corresponding terminal of a test substrate or burn-in substrate.

The present invention also includes protective structures that prevent damage to contacts according to the present invention. Such a protective structure may include one or more elements that are located adjacent to regions of contacts that protrude from a substrate, such as a semiconductor device, a carrier, a probe card, or another electronic component. In addition, a protective structure of the present invention is configured to prevent a contact of the present invention from being bent or otherwise deformed beyond its elastic limit (i.e., the limit from which it will not return substantially to its original configuration). Each element of the protective structure may protrude a lesser distance from the substrate than the adjacent protruding portion. Alternatively, if the protective structure is formed from a material that imparts it with some compressibility or flexibility, it may protrude substantially the same distance from the substrate as, or even a greater distance than, the adjacent protruding portion of the contact protrudes from the substrate.

Some embodiments of protective structures according to the present invention include at least one receptacle that laterally surrounds at least a portion of at least one contact. A height of the protective structure (i.e., the distance the protective structure protrudes from the substrate), a distance walls of the receptacle are spaced apart from the contact, or some combination of these dimensions may prevent compression, flexure, or bending or other deformation of the contact beyond its elastic limit.

Other embodiments of protective structures that incorporate teachings of the present invention include at least one element (e.g., a post) that protrudes from a substrate adjacent to a corresponding contact. The at least one protruding element has a height which will prevent compression or flexion of the contact beyond its elastic limit as that contact is biased against a corresponding bond pad, terminal, or other contact element.

Other features and advantages of the present invention will become apparent to those of ordinary skill in the art through consideration of the ensuing description, the accompanying drawings, and the appended claims.

BRIEF DESCRIPTION OF THE DRAWINGS

In the drawings, which depict features of exemplary embodiments of various aspects of the present invention:

FIGS. 27 through 31 are schematic representations of various exemplary ends of probe card contacts according to the present invention;

FIGS. 32 through 38 are schematic representations of another exemplary embodiment of a method for fabricating probe cards in accordance with teachings of the present invention.

DETAILED DESCRIPTION

Figure 1:
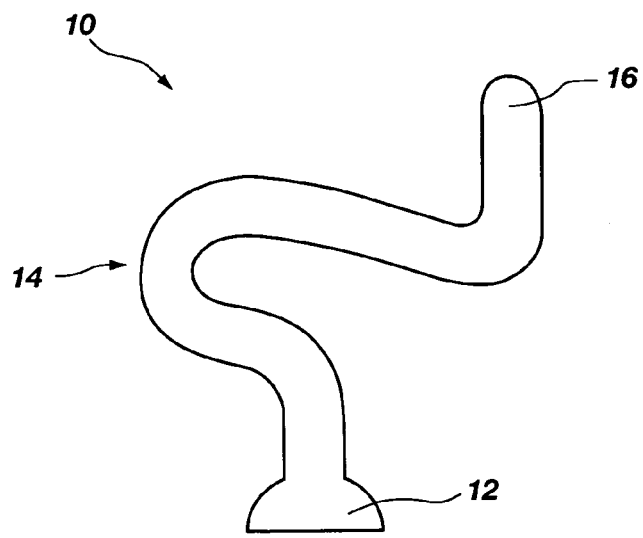
FIG. 1 is a side view of an exemplary contact according to the present invention.
Figure 2:
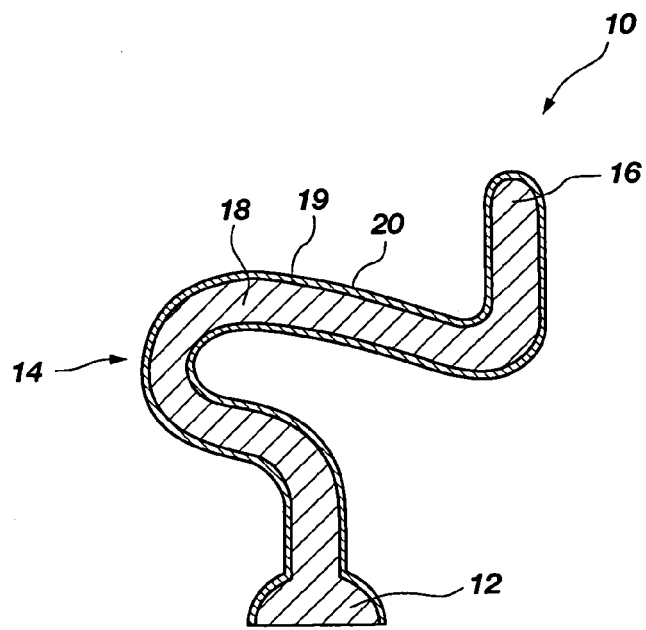
FIG. 2 is a cross-section taken through the contact of FIG. 1.

FIGS. 1 and 2 illustrate an exemplary embodiment of contact 10 according to the present invention. As shown, contact 10 includes a base 12, an intermediate section 14 adjacent to base 12, and a tip 16, which is adjacent to and located on an end of intermediate section 14 opposite from base 12. Base 12 is configured to make electrical contact with a contact pad or circuit (not shown) of a semiconductor device (not shown) (e.g., a bare or packaged semiconductor die), while tip 16 is configured to establish electrical communication with a contact pad (not shown) of another semiconductor device component (e.g., a test substrate or burn-in substrate, another semiconductor device, a carrier substrate, etc.).

Contact 10 includes a core 18 that may be formed from a dielectric material or a conductive material. A layer of conductive material, which is also referred to herein as a "conductive coating 20," covers at least portions of the exterior surface 19 of core 18 so as to facilitate the transmission of electrical signals along contact 10.

Core 18 may have any suitable configuration known in the art. As such, core 18 may be rigid or flexible. By way of example only, a rigid core 18 may be shaped as a point, a tip, a truncated cone or pyramid, a cup cross, or the like. Examples of flexible core 18 shapes include structures with levered arms, such as those described in the FormFactor Patents, including without limitation U.S. Pat. Nos. 5,476,211, 5,772,451, 5,820,014, 5,832,601, 5,852,871, 5,864,946, 5,884,398, 5,912,046 and 5,998,228, the disclosures of which patents are hereby incorporated herein in their entireties by this reference. Of course, in addition to their configurations, the materials from which cores 18 are formed may also lend to their relative rigidity or flexibility.

Conductive coating 20 may include one or more layers of conductive material suitable for use in forming or coating electrical contacts of semiconductor devices or other electronic components. By way of example only, conductive coating 20 may include one or more of a conductive layer, a barrier layer, and a noble layer.

An exemplary embodiment of the manner in which contact 10 may be fabricated is illustrated in FIGS. 3 through 16.

Figure 3:
FIGS. 3 through 8 are schematic representations of a process for fabricating a substrate to be used in forming contacts of the present invention and, optionally, in forming probe cards that incorporate teachings of the present invention.

FIG. 3 depicts a fabrication or sacrificial substrate 100 with a hard mask layer 102 thereon. Substrate 100 may be a sacrificial substrate. Also, substrate 100 may comprise a full or partial semiconductor (e.g., silicon, gallium arsenide, indium phosphide) wafer or a full or partial silicon-on-insulator (SOI) type substrate, such as a silicon-on-ceramic (SOC), silicon-on-glass (SOG), or silicon-on-sapphire (SOS) type substrate. Hard mask layer 102 may comprise silicon nitride or any other material (e.g., silicon oxynitride, silicon oxide, etc.) that is useful for forming a hard mask over substrate 100.

Figure 4:
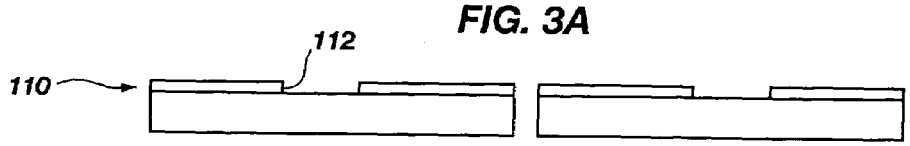

Photoresist 104 is disposed upon a surface 103 of hard mask layer 102 and patterned, as known in the art (e.g., by exposing the same, through a reticle, to one or more appropriate wavelengths of radiation, then developing the same), to form a photomask 106. Photomask 106 includes apertures 108 through which regions of hard mask layer 102 may subsequently be exposed to one or more etchants which are suitable for removing the material of hard mask layer 102. The removal of material from hard mask layer 102 results in the formation of a hard mask 110 with apertures 112 formed therethrough, as shown in FIG. 4.

Figure 5:
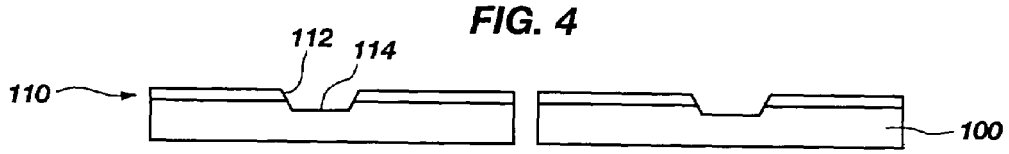

Turning now to FIG. 5, apertures 112 of hard mask 110 are located and configured to facilitate the subsequent formation of recesses 114 of desired configuration in substrate 110. Of course, recesses 114 may be formed, for example, by etching substrate 100 with one or more suitable etchants (isotropic or anisotropic), as known in the art. Each recess 114, which will facilitate the formation of a base 12 (FIGS. 1 and 2) of a contact 10, has a configuration which will impart base 12 with a desired configuration.

Figure 6:

As shown in FIG. 6, another hard mask layer 116 may be formed so as to cover at least the surfaces of recesses 114. Hard mask layer 116 may also cover the remaining portions of hard mask layer 102. Like hard mask layer 102, hard mask layer 116 may be formed from any material which is suitable for use as a hard mask in semiconductor device fabrication processes, including, without limitation, silicon nitride, silicon oxynitride, silicon oxide, and the like. Of course, the processes that are used to form hard mask layer 116 depend upon the type of material to be used.

Figure 7:

Once hard mask layer 116 has been formed, a sacrificial layer 118 is formed thereover, as shown in FIG. 7. By way of example only, sacrificial layer 118 may be formed from aluminum by use of sputtering processes. As another example, sacrificial layer 118 may be formed from a photoresist, which may be applied to hard mask layer 116 by spin-on processes, then cured by exposure to one or more appropriate wavelengths of radiation and development with suitable developing chemicals.

Thereafter, as shown in FIG. 7, if sacrificial layer 118 is formed from a metallic material, such as aluminum, an optional plating mask 120 may be formed over sacrificial layer 118. Plating mask 120 is formed from a material that will not be plated as substrate 100 is exposed into electrolytic, electroless, or immersion plating chemicals and conditions. Thus, plating mask 120 is formed over features on substrate 100 that would otherwise be plated upon exposure to plating chemicals and conditions, such as regions of a metallic sacrificial layer 118 that are not located within recesses 114. Features that are to be plated, such as the portions of a metallic sacrificial layer 118 that are located within recesses 114, are exposed through apertures 122 of plating mask 120 to facilitate their subsequent exposure to plating chemicals and conditions. By way of example only, plating mask 120 may comprise a photomask, which is formed by disposing photoresist on sacrificial layer 118, then selectively exposing (e.g., through a reticle) and developing the photoresist to cure the same.

Figure 8:
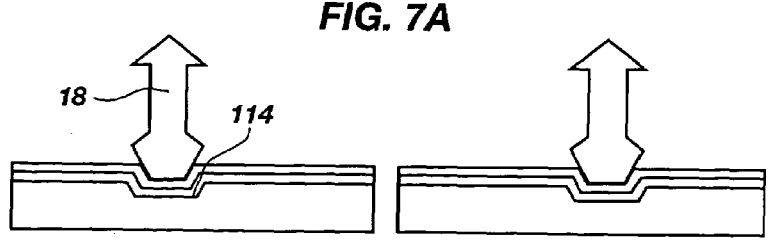

Turning now to FIG. 8, at least a core 18 of a contact 10 (FIGS. 1 and 2) may be formed within each recess 114 by known processes.

For example, as shown in FIGS. 9 and 10A through 10C, core 18 may be formed by stereolithographic processes, such as those described in U.S. Pat. No. 6,524,346 to Farnworth, assigned to the assignee of the present invention and the disclosure of which is hereby incorporated herein in its entirety by this reference. Such processes may be used to form core 18 from a conductive material (e.g., a conductive polymer or conductive photopolymer) or from a dielectric material (e.g., a dielectric photopolymer).

Figure 9:
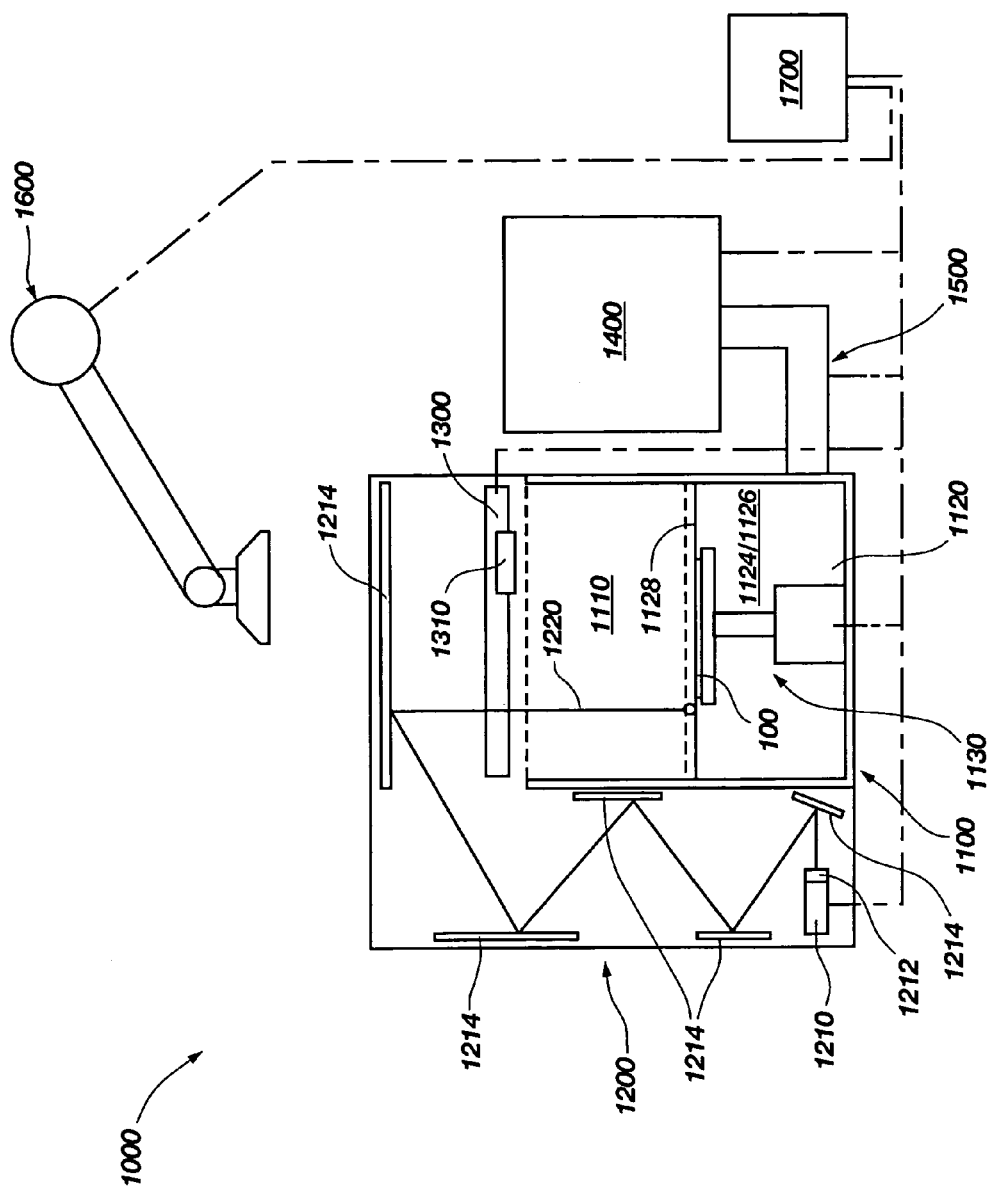
FIG. 9 is a schematic representation of an exemplary stereolithography apparatus that may be used to form various structures of the present invention, including all or part of contacts, support plates of probe cards, and protective structures of the present invention.

FIG. 9 schematically depicts an example of a stereolithographic apparatus 1000 that may be used to fabricate cores 18, as well as several other components that embody teachings of the present invention. Stereolithographic apparatus 1000 includes a fabrication tank 1100, a material consolidation system 1200, a machine vision system 1300, a cleaning component 1400, and a material reclamation system 1500 that are associated with fabrication tank 1100. The depicted stereolithographic apparatus 1000 also includes a substrate handling system 1600, such as a rotary feed system or linear feed system available from Genmark Automation Inc. of Sunnyvale, Calif., for moving fabrication substrates (e.g., substrates 100) from one system of the stereolithographic apparatus to another. Features of one or more of the foregoing systems may be associated with one or more controllers 1700, such as computer processors or smaller groups of logic circuits, in such a way as to effect their operation in a desired manner.

Controller 1700 may comprise a computer or a computer processor, such as a so-called "microprocessor," which may be programmed to effect a number of different functions. Alternatively, controller 1700 may be programmed to effect a specific set of related functions or even a single function. Each controller 1700 of stereolithographic apparatus 1000 may be associated with a single system thereof or a plurality of systems so as to orchestrate the operation of such systems relative to one another.

Fabrication tank 1100 includes a chamber 1110 which is configured to contain a support system 1130. In turn, support system 1130 is configured to carry one or more substrates 100.

Fabrication tank 1100 may also have a reservoir 1120 associated therewith. Reservoir 1120 may be continuous with chamber 1110. Alternatively, reservoir 1120 may be separate from, but communicate with, chamber 1110 in such a way as to provide unconsolidated material 1126 thereto. Reservoir 1120 is configured to at least partially contain a volume 1124 of unconsolidated material 1126, such as a photoimageable polymer, or "photopolymer," particles of thermoplastic polymer, resin-coated particles, or the like.

Photopolymers believed to be suitable for use with a stereolithography apparatus 1000 according to the present invention include, without limitation, ACCURA® SI 40 Hc and AR materials and CIBATOOL SL 5170 and SL 5210 resins for the SLA® 250/50HR and SLA® 500 systems, ACCURA® SI 40 ND material and CIBATOOL SL 5530 resin for the SLA® 5000 and 7000 systems, and CIBATOOL SL 7510 resin for the SLA® 7000 system. The ACCURA® materials are available from 3D Systems, Inc., of Valencia, Calif., while the CIBATOOL resins are available from Ciba Specialty Chemicals Inc. of Bezel, Switzerland.

Reservoir 1120 or another component associated with one or both of fabrication tank 1100 and reservoir 1120 thereof may be configured to maintain a surface 1128 of a portion of volume 1124 located within chamber 1110 at a substantially constant elevation relative to chamber 1110.

A material consolidation system 1200 is associated with fabrication tank 1100 in such a way as to direct consolidating energy 1220 into chamber 1110 thereof, toward at least areas of surface 1128 of volume 1124 of unconsolidated material 1126 within reservoir 1120 that are located over substrate 100. Consolidating energy 1220 may comprise, for example, electromagnetic radiation of a selected wavelength or a range of wavelengths, an electron beam, or other suitable energy for consolidating unconsolidated material 1126. Material consolidation system 1200 includes a source 1210 of consolidating energy 1220. If consolidating energy 1220 is focused, source 1210 or a location control element 1212 associated therewith (e.g., a set of galvanometers, including one for x-axis movement and another for y-axis movement) may be configured to direct, or position, consolidating energy 1220 toward a plurality of desired areas of surface 1128. Alternatively, if consolidating energy 1220 remains relatively unfocused, it may be directed generally toward surface 1128 from a single, fixed location or from a plurality of different locations. In any event, operation of source 1210, as well as movement thereof, if any, may be effected under the direction of controller 1700.

When material consolidation system 1200 directs focused consolidating energy 1220 toward surface 1128 of volume 1124 of unconsolidated material 1126, stereolithographic apparatus 1000 may also include a machine vision system 1300. Machine vision system 1300 facilitates the direction of focused consolidating energy 1220 toward desired locations of features on substrate 100. As with material consolidation system 1200, operation of machine vision system 1300 may be proscribed by controller 1700. If any portion of machine vision system 1300, such as a camera 1310 thereof, moves relative to chamber 1110 of fabrication tank 1100, that portion of machine vision system 1300 may be positioned so as provide a clear path to all of the locations of surface 1128 that are located over each substrate 100 within chamber 1110.

Optionally, one or both of material consolidation system 1200 (which may include a plurality of mirrors 1214) and machine vision system 1300 may be oriented and configured to operate in association with a plurality of fabrication tanks 1100. Of course, one or more controllers 1700 would be useful for orchestrating the operation of material consolidation system 1200, machine vision system 1300, and substrate handling system 1600 relative to a plurality of fabrication tanks 1100.

Cleaning component 1400 of stereolithographic apparatus 1000 may also operate under the direction of controller 1700. Cleaning component 1400 of stereolithographic apparatus 1000 may be continuous with a chamber 1110 of fabrication tank 1100 or positioned adjacent to fabrication tank 1100. If cleaning component 1400 is continuous with chamber 1110, any unconsolidated material 1126 that remains on a substrate 100 may be removed therefrom prior to introduction of another substrate 100 into chamber 1110.

If cleaning component 1400 is positioned adjacent to fabrication tank 1100, residual unconsolidated material 1126 may be removed from a substrate 100 as substrate 100 is removed from chamber 1110. Alternatively, any unconsolidated material 1126 remaining on substrate 100 may be removed therefrom after substrate 100 has been removed from chamber 1110, in which case the cleaning process may occur as another substrate 100 is positioned within chamber 1110.

Material reclamation system 1500 collects excess unconsolidated material 1126 that has been removed from a substrate 100 by cleaning component 1400, then returns the excess unconsolidated material 1126 to reservoir 1120 associated with fabrication tank 1100.

Figure 10A:
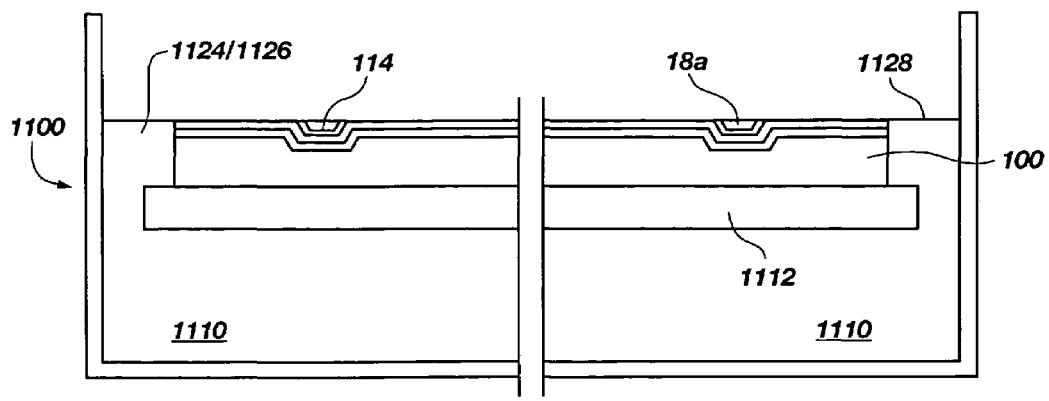
FIGS. 10A through 10C schematically illustrate a stereolithographic process for fabricating at least part of a contact of the present invention.
Figure 10B:
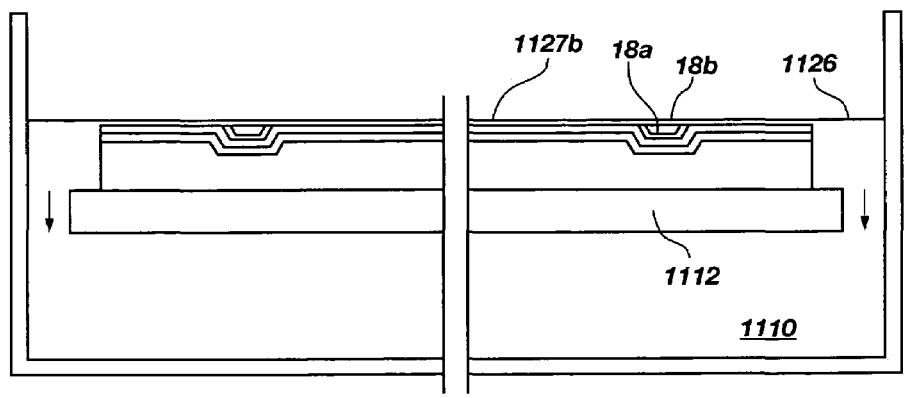
Figure 10C:
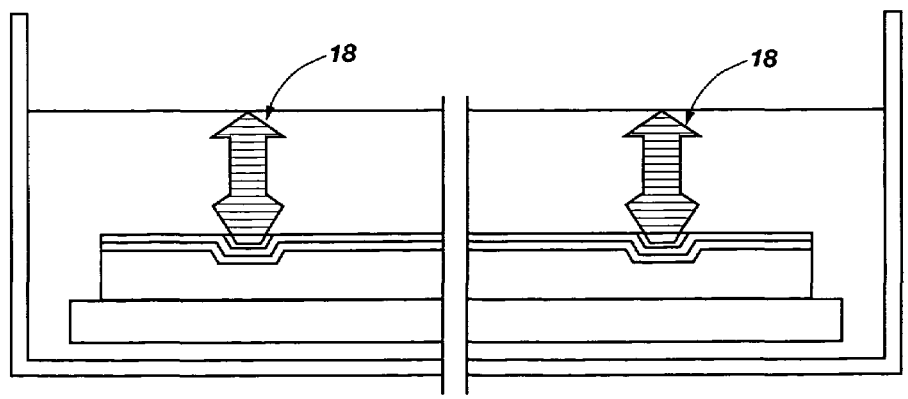

In use, controller 1700, under control of computer-aided drafting (CAD) or stereolithography (.stl) programming, may orchestrate operation of various components of stereolithographic apparatus 1000 to fabricate cores 18, as well as other features. FIGS. 10A through 10C depict an example of the manner in which cores 18 may be fabricated.

With reference to FIG. 10A, substrate 100 is positioned on a support platen 1112 within chamber 1110 of fabrication tank 1100. As depicted, substrate 100 is submerged within volume 1124 of unconsolidated material 1126 so that unconsolidated material 1126 fills recesses 114. Support platen 1112 is then raised such that the upper surface of substrate 100 is brought to about the same level as (i.e., coplanar with) surface 1128 of volume 1124. Unconsolidated material 1126 within recesses 114 may then be selectively consolidated to form an initial layer 18a of each core 18 (FIG. 10C).

Next, as shown in FIG. 10B, support platen 1112 may be lowered within chamber 1110 a distance that corresponds substantially to a thickness of a next layer 18b (FIG. 10C) of each core 18. Unconsolidated material 1126 of substantially the same thickness then flows over substrate 100 and layer 18a. Thereafter, selected regions of the newly formed layer 1127b of unconsolidated material 1126 are at least partially consolidated to form or define layer 18b of core 18 therefrom. Layer 18b is at least partially superimposed over, contiguous with, and mutually adhered to layer 18a.

Turning to FIG. 10C, these processes are repeated a number of times until core 18 has been completely formed.

When apparatus such as that shown in FIG. 9 are used to fabricate cores 18, a number of cores 18 may be simultaneously manufactured as a plurality of superimposed contiguous, mutually adhered material layers.

Figure 11A:
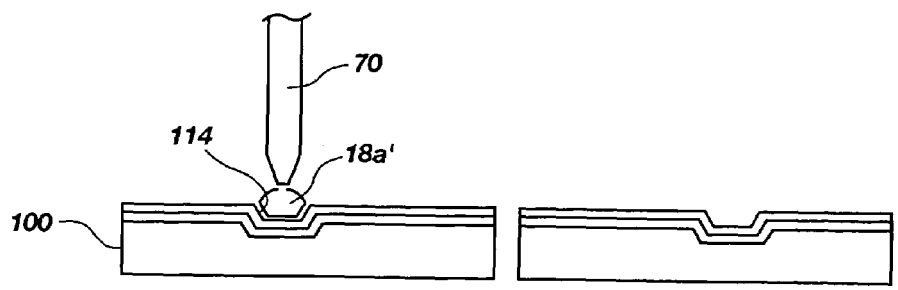
FIGS. 11A through 11D schematically depict use of a wire-bonding capillary to form a contact according to the present invention.
Figure 11B:
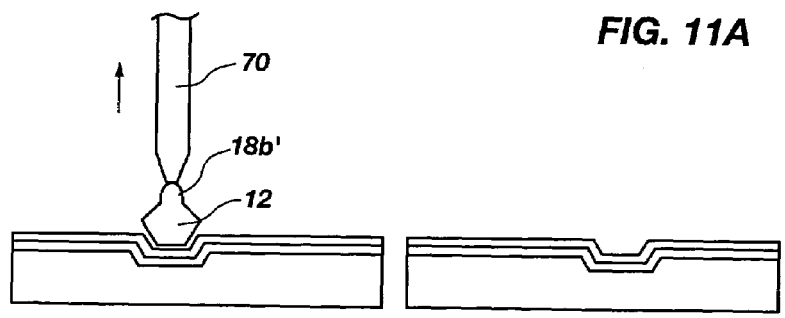
Figure 11C:
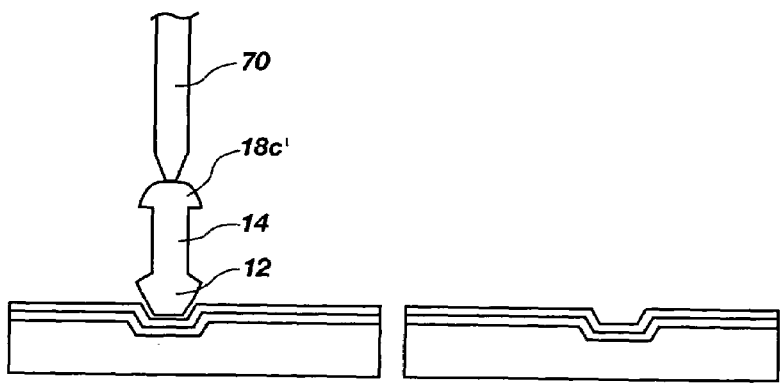

Another example of the manner in which core 18 of a contact 10 of the present invention may be fabricated is shown in FIGS. 11A through 11C. In this example, core 18 may comprise a conductive material (e.g., gold, aluminum, etc.) and may be formed using a dispense element 70, such as a wire-bonding capillary, such as in the manner described in the FormFactor Patents. Alternatively, the material of core 18 may be dispensed with a needle, such as the type used to dispense underfill materials and other packaging materials. Of course, the use of other suitable methods for fabricating cores 18 of contacts 10 according to the present invention are also within the scope of the present invention.

Figure 11D:
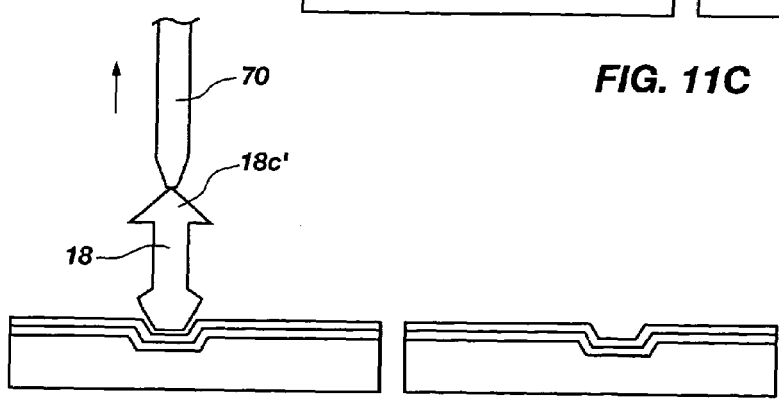

In FIG. 11A, dispense element 70 is positioned over a recess 114 in substrate 100 and a core material introduced into recess 114 to form a first portion 18a' of core 18 (FIG. 8), which comprises at least a portion of base 12 of contact 10 (FIGS. 1, 2, and 11B). Thereafter, dispense element 70 may be raised to form a protruding portion 18b' of core 18, which forms part of intermediate section 14 of contact 10 (FIGS. 1 and 2). Once intermediate section 14 has been formed, as shown in FIG. 11C, movement of dispense element 70 may be momentarily ceased to facilitate formation of a tip section 18c' which is enlarged relative to intermediate section 14. Dispense element 70 may again be raised to complete formation of tip 16 of core 18, as shown in FIG. 11D.

Figure 12:
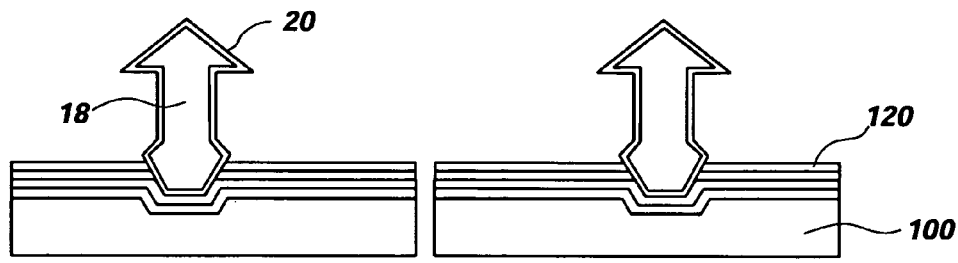
FIG. 12 schematically illustrates contacts that have been coated with conductive material.
Figure 12A:
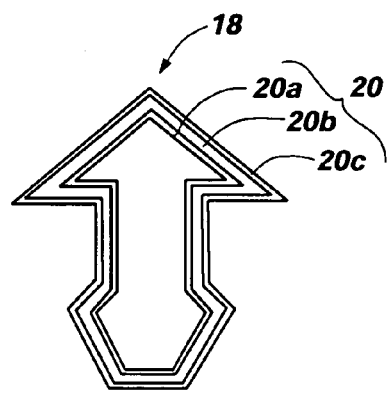
FIG. 12A schematically depicts contacts that have been coated with multiple regions or layers of conductive material.

Each core 18 may then be plated or otherwise coated with conductive material to form a conductive coating 20 thereon, as shown in FIG. 12. Conductive coating 20 may be formed by way of known electrolytic, electroless, or immersion plating techniques. If core 18 is formed from a nonmetallic material, such as a dielectric photopolymer, it may be necessary to prepare or treat the surface of core 18, as known in the art, prior to forming conductive coating 20 thereon. Conductive coating 20 may include one or more sublayers or subregions 20a, 20b, etc., as shown in FIG. 12A. For example, if core 18 is formed from a dielectric material, conductive coating 20 may include a conductive sublayer 20a (e.g., a sublayer of copper, aluminum, etc.), as well as a barrier sublayer 20b (e.g., a sublayer of nickel) and a noble sublayer 20c (e.g., a sublayer of gold). As another example, if core 18 comprises a conductive material, conductive coating 20 may include a barrier sublayer and a noble sublayer. Plating mask 120 prevents other features on substrate 100 from being plated.

As shown in FIGS. 13A through 15, a support plate 130 (FIG. 15) may be formed around intermediate sections 14 of contacts 10. By way of example only, known stereolithographic processes may be used to fabricate support plate 130, such as with the apparatus shown in and described with respect to FIG. 9.

Figure 15:
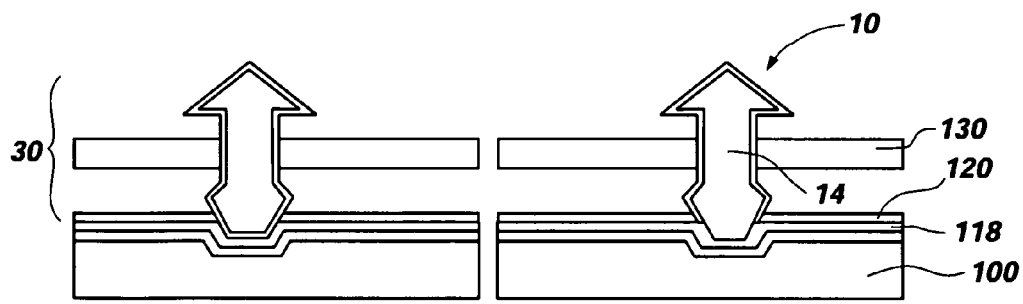
FIG. 15 schematically represents the assembly that results from fabrication of a support plate around the contacts that protrude from the substrate.
Figure 13A:
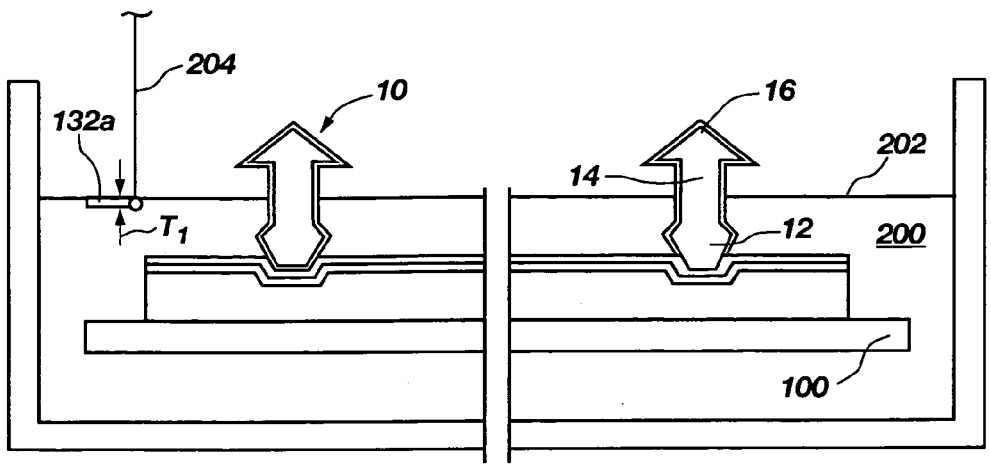
FIGS. 13A and 13B depict the stereolithographic fabrication of a support plate of a probe card according to the present invention.

In FIG. 13A, substrate 100, along with contacts 10 and all of the other features that have been formed therein and thereon, may be partially submerged beneath a surface 202 of a volume 200 of photopolymer, with tips 16 and portions of intermediate sections 14 of contacts 10 protruding above surface 202. Surface 202 may then be exposed to radiation of one or more wavelengths that are appropriate for at least partially polymerizing, or consolidating, the photopolymer at surface 202 to form a layer 132a of support plate 130 (FIG. 15). Preferably, such exposure is effected with focused radiation 204 (e.g., a laser beam), which has a focal point that facilitates control of a depth $T_1$ to which the photopolymer is at least partially consolidated and, thus, a thickness of layer 132a. Further, by angling an energy beam used to expose surface 202 to radiation from a perpendicular orientation to expose the surface 202 under tip 16, such consolidation may be effected so that at least portions of the outer peripheries of base 12 and tip 16 are superimposed over one or more portions of layer 132a to trap intermediate section 14 of contact 10 within layer 132a.

Figure 13B:
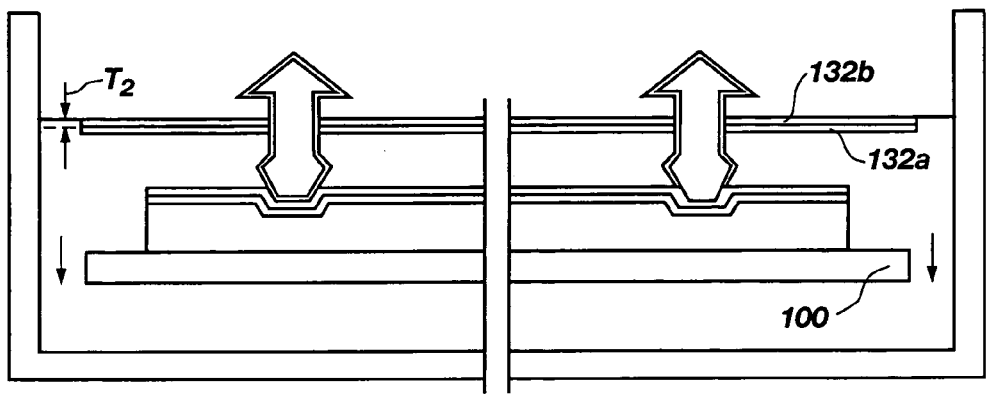

Once layer 132a has been formed, substrate 100 and layer 132a may be submerged within volume 200 of photopolymer a distance which corresponds to a thickness $T_2$ of a next-higher layer 132b of support plate 130 (FIG. 15), as shown in FIG. 13B. The process described in reference to FIG. 13A may then be repeated to form layer 132b of support plate 130, with layer 132b being at least partially superimposed over, contiguous with, and mutually adhered to the previously formed layer 132a. This process may be repeated until a support plate 130 of desired thickness has been formed.

Figure 14:
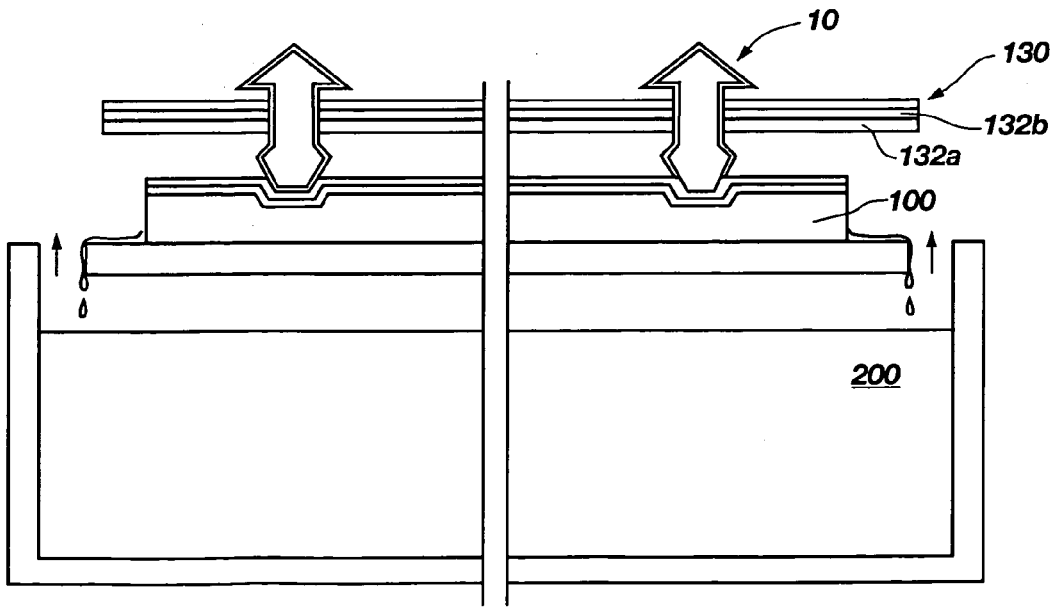
FIG. 14 shows the support plate, contacts, and substrate being removed from a fabrication tank of a stereolithography apparatus.

After each layer 132a, 132b, etc. of support plate 130 has been formed, substrate 100, contacts 10, and support plate 130 may be removed from volume 200 of photopolymer, as shown in FIG. 14. Thereafter, the material of layers 132a, 132b, etc. may be further consolidated by exposing the same to energy or radiation (not shown), such as nonfocused radiation of one or more curing wavelengths, heat, or another suitable form of energy or radiation, as known in the art. Once fabrication of support plate 130 is complete, as shown in FIG. 15, support plate 130 and contacts 10 extending therethrough form a probe card 30 (see also FIG. 19). Optionally, support plate 130 may be formed as a large panel and severed after fabrication thereof into smaller segments to form a plurality of probe cards 30.

Figure 16:
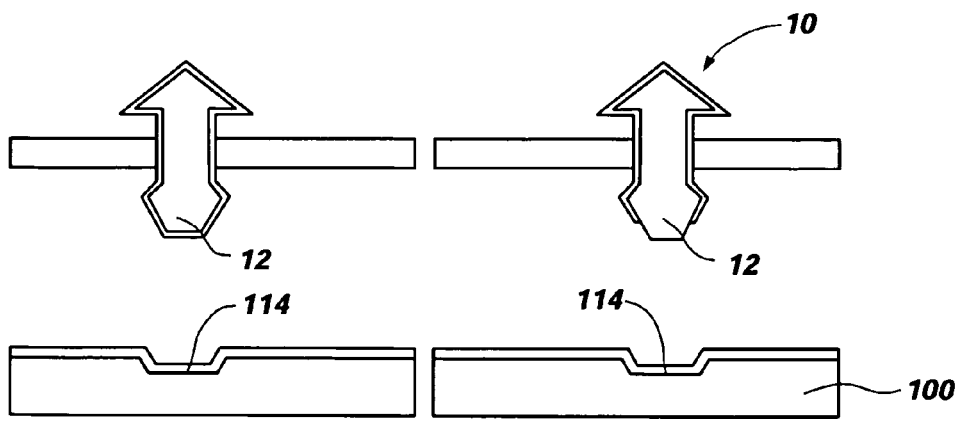
FIG. 16 schematically illustrates removal of the contacts from the substrate on which they were fabricated.

Turning now to FIG. 16, an example of the manner in which contacts 10 may be freed from substrate 100 is shown. Sacrificial layer 118 (FIG. 15) and, optionally, plating mask 120 (FIG. 15) may be removed by known processes. If sacrificial layer 118 is formed from aluminum, one or more suitable etchants (e.g., tetramethyl ammonium hydroxide (TMAH), potassium hydroxide (KOH), sodium hydroxide (NaOH), etc., or any combination thereof) may be used to dissolve or otherwise remove the aluminum. If a photoresist was used to form sacrificial layer 118, sacrificial layer 118 may be exposed to a resist strip suitable for dissolving or otherwise removing the photoresist. When sacrificial layer 118 is removed, overlying structures are "lifted-off" of substrate 100. Thus, bases 12 of contacts 10 are no longer anchored within recesses 114 and may be removed therefrom. Substrate 100 may then be discarded. Alternatively, substrate 100 may again be used in the processes described with reference to FIGS. 6 through 16 to form additional contacts 10.

Figure 3A:
Figure 6A:
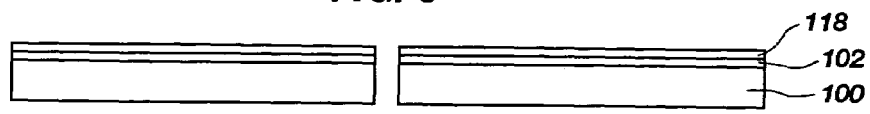
Figure 7A:
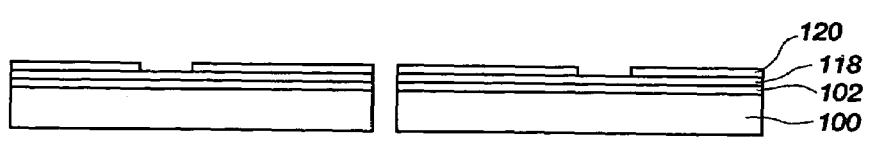

As an alternative to the process shown in FIGS. 3 through 16, Contacts 10 according to the present invention may be fabricated without forming recesses 114 in a sacrificial substrate 100. Instead, as shown in FIGS. 3A, 6A, and 7A, substrate 100 may merely be coated with a hard mask layer 102 (FIG. 3A), a sacrificial layer 118 formed thereover (FIG. 6A), and plating mask 120 formed over selected regions (i.e., those where contacts 10 are not to be formed) of sacrificial layer 118 (FIG. 7A). Contacts 10 may then be formed by the processes that have been described in reference to FIGS. 8 through 16. Of course, when nonstereolithographic processes are used to form cores 18, the areas of cores 18 which are formed on exposed regions of sacrificial layer 118 may be flat, or planar. In addition, the shape of each core 18, at base 12 of contact 10, may be limited by the process and materials that are used to form that core 18.

Figure 17:
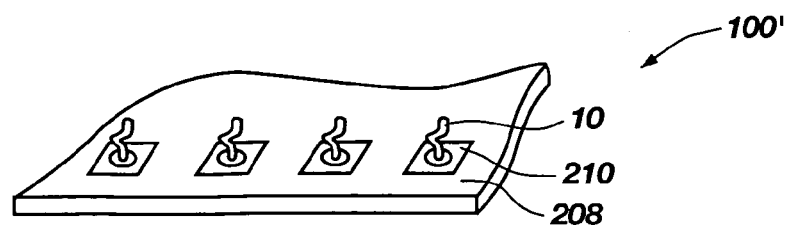
FIG. 17 is a partial perspective view of a semiconductor device or other semiconductor device component that includes contacts of the present invention secured to the bond pads or terminals thereof.
Figure 18:
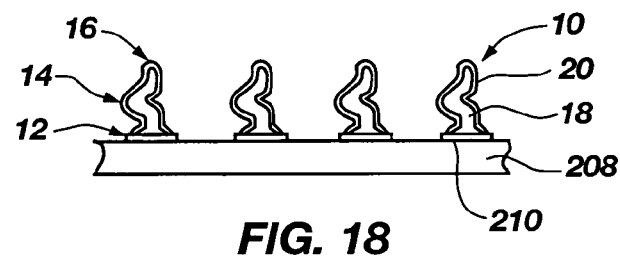
FIG. 18 is a cross-sectional representation of the semiconductor device or other semiconductor device component of FIG. 17.

Referring now to FIGS. 17 and 18, if the substrate upon which contacts 10 are to be fabricated is not a fabrication or sacrificial substrate but, rather, a substrate 100' that carries one or more semiconductor devices 208 or other semiconductor device components (e.g., interposers), contacts 10 may instead be formed directly on contact pads 210 of the semiconductor devices 208 or other semiconductor device components, such as by the above-described processes. By way of example only, the processes that are depicted in and described with reference to FIGS. 7 through 12 may be used to form contacts 10 directly on contact pads 210 of one or more semiconductor devices 208 or other semiconductor device components. Of course, as shown in FIG. 18, if a core 18 of each contact 10 comprises a dielectric material, conductive coating 20 must provide a conductive path from the corresponding contact pad 210, along base 12 and intermediate section 14 of contact 10, and onto tip 16 thereof.

Figure 19:
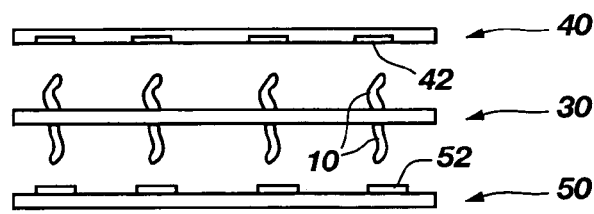
FIG. 19 is a schematic illustration of the manner in which a probe card may be assembled between a semiconductor device and a test or burn-in substrate.

The present invention also includes probe cards, as well as methods for fabricating probe cards. As depicted in FIG. 19 a probe card 30 may be positioned between one or more semiconductor devices 40 and a test or burn-in substrate 50. Contacts 10 of probe card 30 are located so as to align between bond pads 42 of each semiconductor device 40 and corresponding terminals 52 of a test or burn-in substrate 50 which is configured for use with semiconductor device 40. Each contact 10 of probe card 30 is configured to temporarily establish electrical communication between its corresponding bond pad 42 and terminal 52 as one or both of semiconductor device 40 and test or burn-in substrate 50 is biased toward the other. In this fashion, probe card 30 facilitates the testing or burning-in of one or more semiconductor devices 40 with appropriate test or burn-in equipment (not shown) with which test or burn-in substrate 50 has been assembled.

Figure 20:
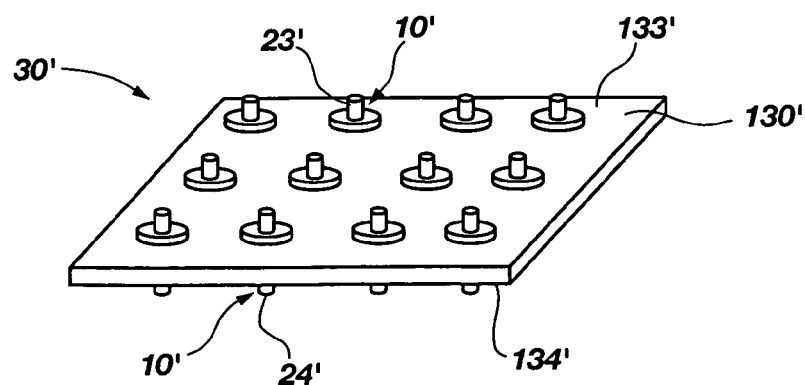
FIG. 20 is a partial perspective view of another exemplary embodiment of probe card that incorporates teachings of the present invention.

One example of a probe card 30 according to the present invention is shown in FIG. 15. Another example of probe card 30' that incorporates teachings of the present invention is depicted in FIG. 20. In addition to including contacts 10, 10', a probe card 30, 30' according to the present invention may include circuit traces (not shown) on one or both sides thereof. Such circuit traces may be fabricated by known processes (e.g., mask and etch processes, use of stereolithography techniques, a so-called micropen and conductive ink, etc.).

FIGS. 21 through 26 illustrate one embodiment of a method for fabricating probe card 30', while FIGS. 32 through 38 depict another embodiment of a method by which probe card 30' may be fabricated.

As shown in FIG. 20, probe card 30' includes a support plate 130' with major surfaces 133' and 134' that face opposite directions. Apertures 131' (FIG. 22) are formed through support plate 130' at locations which correspond to the locations of bond pads 42 (FIG. 19) and terminals 52 (FIG. 19), respectively, on semiconductor devices 40 (FIG. 19) and test or burn-in substrates 50 (FIG. 19) with which probe card 30' is configured to be used. A contact 10' extends through each aperture 131' of support plate 130', with one end 23' that protrudes from surface 133' and another end 24' that protrudes from surface 134'.

Figure 26:
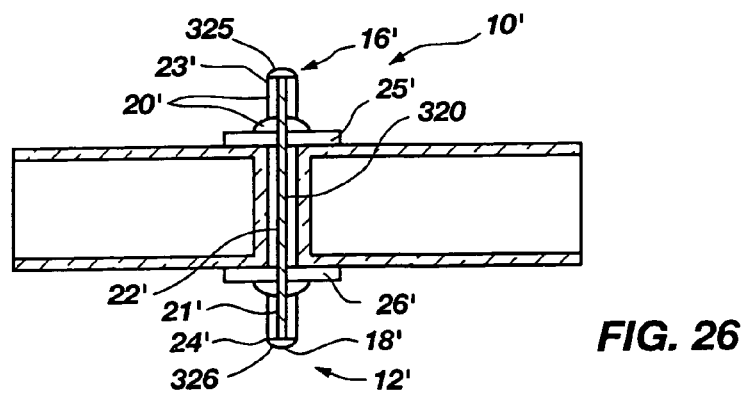

With reference to FIG. 26, each contact 10' includes an outer shell 20' which includes a channel 21' extending substantially centrally through the length, or height, thereof. As shown, channel 21' may contain a quantity of conductive material, which forms a conductive core 18' that extends through the entire length of outer shell 20'.

Outer shell 20' may be rigid or flexible, depending at least in part upon the configuration thereof and the materials that are used to form the same. Also, the material or materials from which outer shell 20' is fabricated may be dielectric or electrically conductive. As illustrated, outer shell 20' includes two collars 25' and 26', which extend radially from the remainder (e.g., a body 22') of outer shell 20' and are positioned so as to be located adjacent to opposite surfaces 133' and 134', respectively, of support plate 130' (FIG. 20).

As depicted, the ends of conductive core 18' may be enlarged at ends 23' and 24' of contact 10' and extend onto portions of outer shell 20' that are located at ends 23' and 24'. A base 12' of each core 18' and, thus, of contact 10' of which core 18' is a part establishes electrical communication with a corresponding terminal 52 of test or burn-in substrate 50 (FIG. 19), while a tip 16' of each contact 10' establishes electrical communication with a corresponding bond pad 42 of a semiconductor device 40 (FIG. 19) to be tested or burned-in. While the connection between base 12' and terminal 52 may be temporary (e.g., by biasing base 12' against terminal 52) or permanent (e.g., by bonding base 12' to terminal 52), it is currently preferred that the connection between tip 16' and bond pad 42 be temporary (e.g., by biasing tip 16' against bond pad 42).

Turning now to FIGS. 21 through 26, an exemplary method for fabricating probe card 30' and contacts 10' thereof is depicted.

Figure 21:
FIGS. 21 through 26 are cross-sectional representations of an exemplary process for fabricating the probe card shown in FIG. 20.

In FIG. 21, a substrate 300 is provided. Substrate 300 may be a substantially planar member, as depicted, or have any other suitable shape. Moreover, substrate 300 may be formed from a variety of suitable materials, including, without limitation, polymers, metals, dielectric materials (e.g., glass, ceramic, etc.), semiconductor materials (e.g., silicon, gallium arsenide, indium phosphide, etc.), or any combination of the foregoing. Specific examples of structures that may be employed as substrate 300 include full or partial wafers of semiconductor material and full or partial SOI-type substrates.

Figure 22:
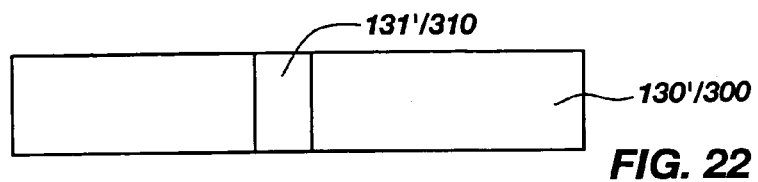

Turning to FIG. 22, apertures 310 are formed through substrate 300 at locations where contacts 10' (FIG. 20) are to be located. Apertures 310 may be formed by any process which is suitable for use with the material of substrate 300. By way of example only, apertures 310 may be formed through substrate 300 by known drilling techniques (e.g., laser drilling, mechanical drilling, etc.). Alternatively, mask and etch processes may be used to form apertures 310 through desired locations of substrate 300.

Figure 23:
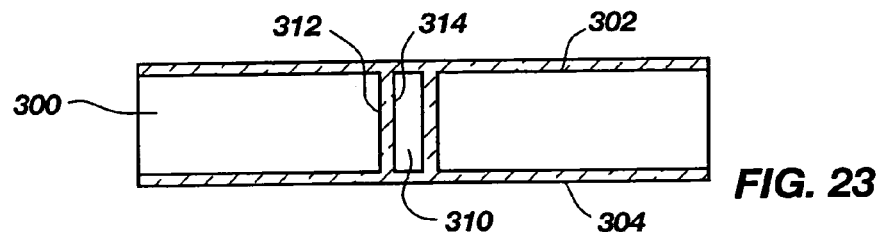

If substrate 300 comprises a conductive or semiconductive material, surfaces 312 of apertures 310 may be coated with a layer 314 of dielectric material, as shown in FIG. 23. Layer 314 of dielectric material may likewise extend onto all or part of surfaces 302 and 304 of substrate 300. In addition to passivating surfaces 312, 302, 304, layer 314 may facilitate adhesion of subsequently formed structures to substrate 300. By way of example only, layer 314 may comprise silicon oxide, silicon nitride, or silicon oxynitride and may be formed by any suitable process known in the art (e.g., silicon oxide may be grown, spun-on, or deposited; silicon nitride and silicon oxynitride may be deposited).

Figure 24:
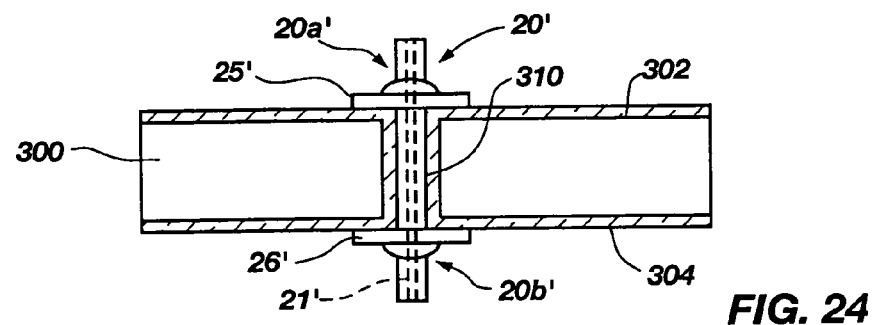

As shown in FIG. 24, at least portions of contacts may be formed within at least some apertures 310 of substrate 300. For example and as illustrated in FIG. 24, an outer shell 20' of a contact 10' (FIG. 26) may be formed within each aperture 310. Outer shell 20' may comprise a dielectric material (e.g., a dielectric photopolymer) and may be fabricated by known stereolithography processes, such as those described above in reference to FIGS. 13A through 15. As outer shell 20' may include collars 25' and 26' that are to be positioned adjacent opposite surfaces 302 and 304 of substrate 300, the portion 20a' of outer shell 20' that protrudes from surface 302 may be fabricated, then substrate 300 flipped, or inverted, so that the remainder 20b' of outer shell 20', which protrudes from surface 304 of substrate 300, may be fabricated.

Outer shell 20' may be fabricated with a channel 21' extending therethrough, or channel 21' may be subsequently formed therethrough by known processes (e.g., with a laser drill, mechanical drill, etc.). Optionally, channel 21' may be formed during the fabrication of outer shell 20', then bored to increase one or more cross-sectional dimensions (e.g., radius and circumference) thereof.

Figure 25:
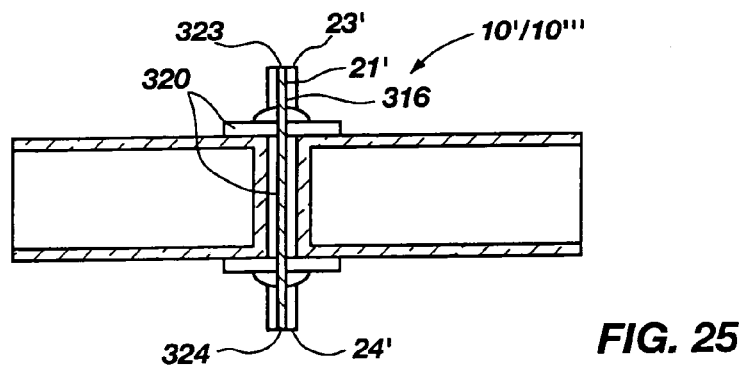

Next, as depicted in FIG. 25, conductive material 316 is introduced into channel 21'. By way of example only, needle-dispense processes may be used to introduce conductive material 316 into channel 21' or conductive material 316 may be introduced into channel 21' using a pressurized wire-bonding capillary. If needle dispense processes are used, a conductive or conductor-filled polymer may be introduced into channel 21', then cured by suitable processes (e.g., exposure to an appropriate wavelength of radiation, heat, etc.). When a wire-bonding capillary is used to force, under positive pressure, a molten metal (e.g., gold, copper, aluminum, etc.) into channel 21', the metal will harden upon being cooled. Of course, the material from which outer shell 20' is formed should be able to withstand the temperature of the molten metal of conductive material 316, as well as substantially maintain its structural integrity when exposed to the molten metal.

As a result of introducing conductive material 316 into channel 21', a conductive element 320 is formed therein. Conductive element 320 includes a first end 323, which is exposed at and may protrude from end 23' of contact 10', and a second end 324, which is exposed at and may protrude from end 24' of contact 10'.

FIG. 26 depicts the formation of a cap 325, 326 at each end 23', 24' of contact 10' from ends 323 and 324 (FIG. 25), respectively, of conductive element 320, which may complete the formation of core 18' of contact 10'. When conductive element 320 comprises a conductive or conductor-filled polymer, caps 325 and 326 may be formed prior to curing or solidifying conductive material 316 (FIG. 25), as the at least partially liquid conductive material 316 flows onto ends of outer shell 20'. If conductive material 316 comprises metal, caps 325 and 326 may be formed by heating ends 323 and 324 of conductive element 320 to a molten state and permitting them to flow onto the ends of outer shell 20'.

Additionally, as shown in FIGS. 29 and 30, one or both ends 323, 324 of conductive element 320 (FIG. 26) may be drawn, by known techniques, so as to form an extension (e.g., extension 328 of FIG. 29 or extension 328' of FIG. 30) from core 18' (FIG. 26), which extension protrudes from outer shell 20', 20" of contact 10', 10"', repectively. Alternatively, one or more extensions (e.g., extensions 328, 328') may be formed separately from core 18'. By way of example only, a wire-bonding capillary may be used to draw or form each extension.

As an alternative to the use of dielectric material to form an outer shell 20', electrically conductive contacts 10'" may be formed within at least some apertures 310 of substrate 300, as shown in FIG. 24. As an example, stereolithography processes, such as those described above in reference to FIGS. 13A through 15, may be used to form contacts 10 from conductive material, such as a conductive or conductor-filled photopolymer.

As another alternative, thermoplastic material may be sprayed, or "jetted," onto substrate 300 layer-by-layer. Examples of such processes are described in U.S. Pat. Nos. 6,532,394, 6,508,971, 6,492,651, 6,490,496, 6,406,531, 6,352,668, 6,347,257, 6,305,769, 6,270,335, 6,193,923, 6,133,355, 5,340,433, 5,260,009, 5,216,616, 5,141,680, 5,134,569, 5,121,329, and 4,665,492, the disclosures of each of which are hereby incorporated herein in their entireties by this reference. Additional examples of such processes are described in Grimm, Todd, "Stereolithography, Selective Laser Sintering and PolyJet™: Evaluating and Applying the Right Technology," Pamphlet produced by Accelerated Technologies, Inc. of Austin, Tex. (2002), and in the pamphlet entitled "PolyJet $2^{nd}$ Generation Technology," which was produced by Objet Geometries Ltd. of Rehovot, Israel, in 2003, the disclosures of both of which are hereby incorporated herein, in their entireties, by this reference.

Of course, when a conductive contact 10" is formed directly within one or more apertures 310 of substrate 300, it may not be necessary to form a core of another conductive material therein, although doing so (e.g., by the processes described above with reference to FIGS. 24 through 26) is within the scope of the present invention.

FIGS. 27 through 31 illustrate examples of different configurations of contacts (e.g., contacts 10', 10") according to the present invention.

Another exemplary embodiment of a method for fabricating a probe card 30' (FIG. 20) in accordance with teachings of the present invention is depicted in FIGS. 32 through 38.

Figure 32:
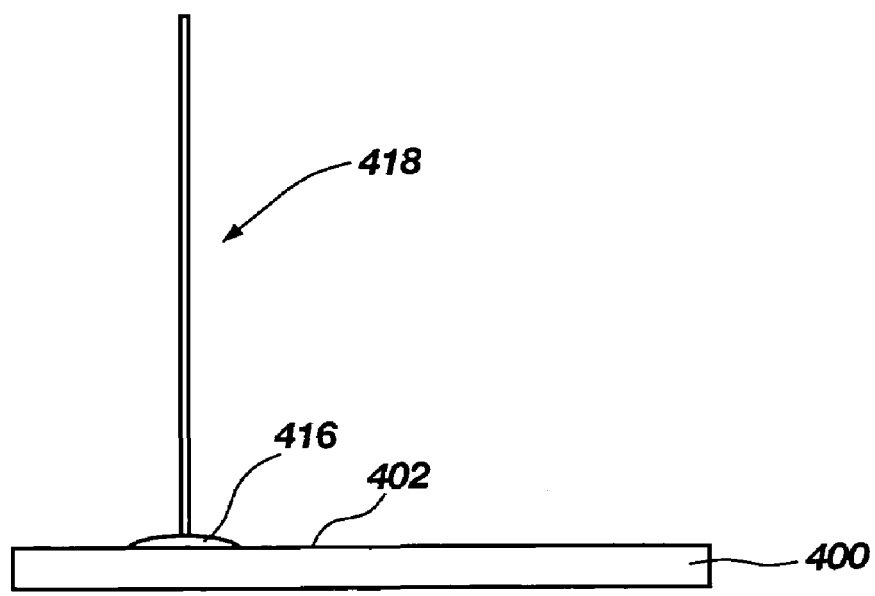

In FIG. 32, conductive elements 418 (only one being shown) are formed on a substrate 400. Each conductive element 418 is a substantially linear structure which protrudes from substrate 400 and which is secured to a surface 402 thereof with a bonding joint 416. Any suitable, known process may be used to form conductive elements 418. For example, and not to limit the scope of the present invention, bonding joints 416 and conductive elements 418 may be formed with a wire-bonding capillary.

Figure 33:
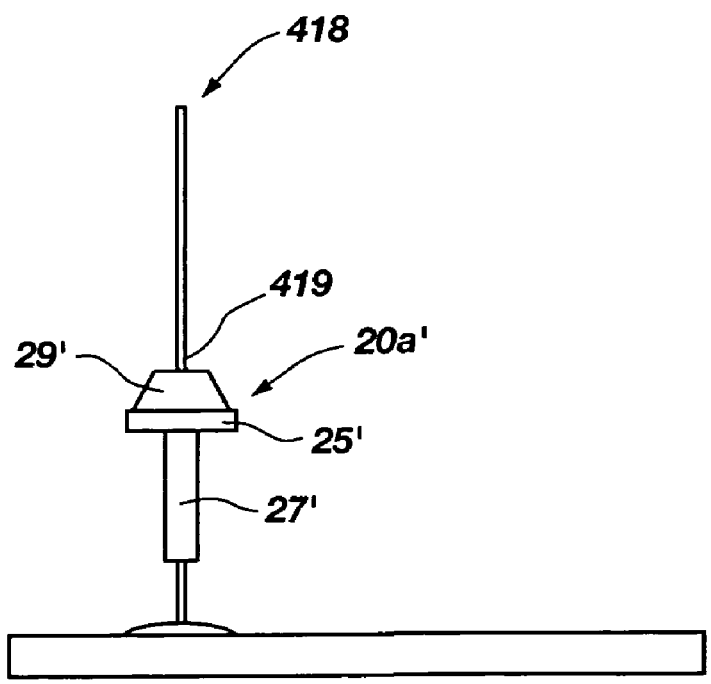

Next, as shown in FIG. 33, a portion 20a' of an outer shell 20' (FIG. 26) is formed around an intermediate section 419 of each conductive element 418. Portions 20a' may be formed by stereolithography processes, such as those which have been described above in reference to FIGS. 13 through 15.

As depicted, each portion 20a' includes a protruding element 27', a collar 25', and a tapered alignment element 29'. Protruding element 27' is an elongate member which may be cylindrical in shape. Collar 25' is located adjacent to protruding element 27' and extends outwardly (e.g., radially) therefrom. Alignment element 29', which may be frustoconical in shape, is positioned adjacent to collar 25' and on an opposite side thereof from protruding element 27'. Although alignment element 29' is depicted as abutting collar 25', it may be spaced apart therefrom by a section of portion 20a' which has a reduced cross section relative to collar 25' and alignment element 29'.

Figure 34:
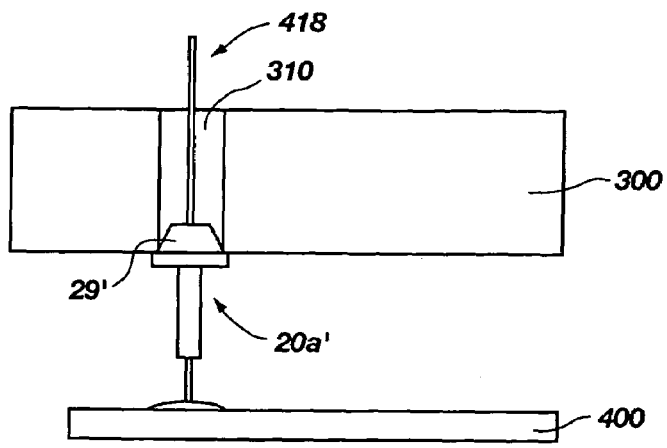

Thereafter, as illustrated in FIG. 34, a substrate 300 through which apertures 310 have already been formed (see, e.g., FIG. 22 and accompanying text) is positioned over substrate 400, with apertures 310 being aligned over conductive elements 418 and portions 20a' of outer shells 20' that have been formed thereon. Such alignment may be effected in any suitable manner known in the art, e.g., mechanically, optically, or otherwise.

Figure 35:
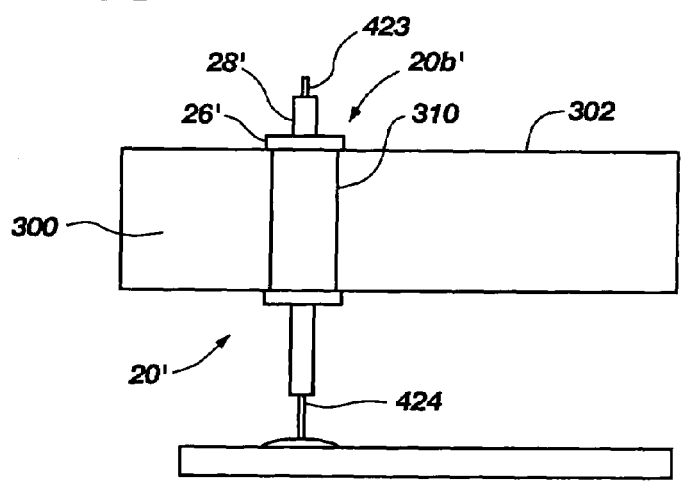

Once substrate 300 has been properly positioned, with alignment elements 29' of each portion 20a' being at least partially disposed within a corresponding aperture 310 and a portion of each conductive element 418 extending through the corresponding aperture 310 of substrate 300, a remainder 20b' of each outer shell 20' may be fabricated, as illustrated in FIG. 35. As shown, each remainder 20b' extends partially into aperture 310 and includes features, such as the depicted collar 26' and protruding element 28', which protrude from surface 302 of substrate 300. By way of example only, known stereolithography processes, such as those described with respect to FIGS. 13 through 15, may be used to form each remainder 20b' and, thus, to complete the formation of each corresponding outer shell 20'.

Figure 36:
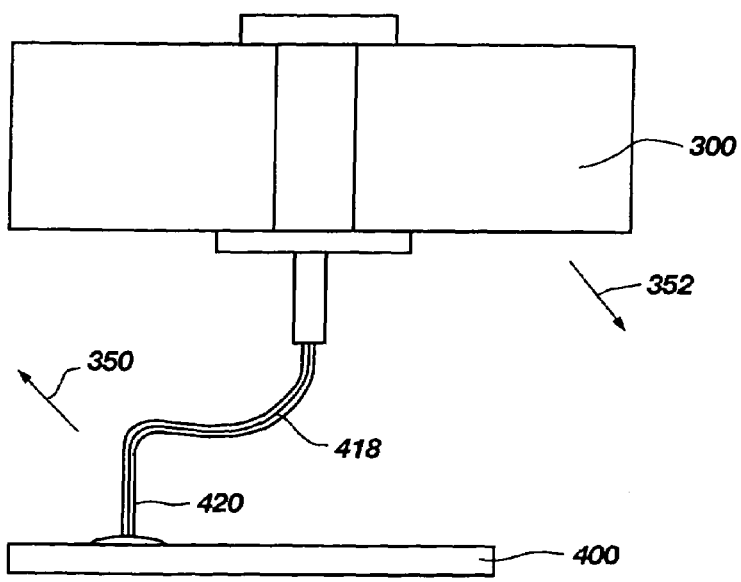

FIG. 36 shows that, if desired, conductive elements 418 may be bent. Such bending may be effected, for example, by moving one or both of substrate 300 and substrate 400 relative to the other, as indicated by arrows 350, 352.

Once outer shells 20' have been fabricated, as depicted in FIG. 37, bonding joints 416 may be removed from substrate 400 (e.g., by heating at least bonding joints 416) or conductive elements 418 severed (e.g., cut) to facilitate the removal of substrate 400 from the remainder of the assembly.

As FIG. 38 illustrates, a cap 425, 426 may then be formed at each end 23', 24' of contact 10' from ends 423 and 424 (FIG. 36), respectively, of conductive element 418, which may complete the formation of core 18' of contact 10'. As an example of the manner in which caps 425 and 426 may be formed, ends 423 and 424 of conductive element 418 may be heated to a molten state and permitted to flow onto the ends of outer shell 20'.

Optionally, one or both ends 323, 324 of conductive element 320 may be drawn, by known techniques, in such a way as to form an extension (e.g., extension 328 of FIG. 29 or extension 328' of FIG. 30) from core 18', which extension protrudes from outer shell 20' of contact 10'. Alternatively, one or more extensions may be formed separately from core 18'. By way of example only, a wire-bonding capillary may be used to draw or form each extension.

At some point during the process that has been described with reference to FIGS. 32 through 38, and with returned reference to FIG. 36, a layer 420 of conductive material may be formed on exposed portions of each conductive element 418. Layer 420 may comprise a single layer or a plurality of sublayers (e.g., a barrier sublayer, a noble sublayer, etc.), each of which may, by way of nonlimiting example, be formed by way of known plating processes. Layer 420 may impart some rigidity to conductive element 418, providing some resilience when conductive element 418 is compressed or otherwise flexed. Alternatively, or additionally, layer 420 may prevent oxidation or corrosion of conductive element 418.

Such plating may be effected just after the formation of conductive elements 418 (FIG. 32), following the bending, if any, of conductive elements 418 (FIG. 35), or at any other suitable point during the fabrication of a probe card 30 in accordance with the processes of FIGS. 32 through 37.

Figure 39:
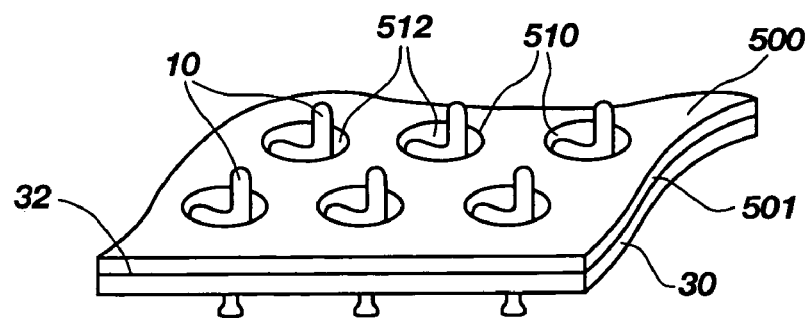
FIGS. 39 through 41 are partial perspective views that illustrate exemplary embodiments of protective structures of the present invention, as well as the manner in which they may be positioned relative to contacts and the substrates from which contacts protrude.
Figure 40:
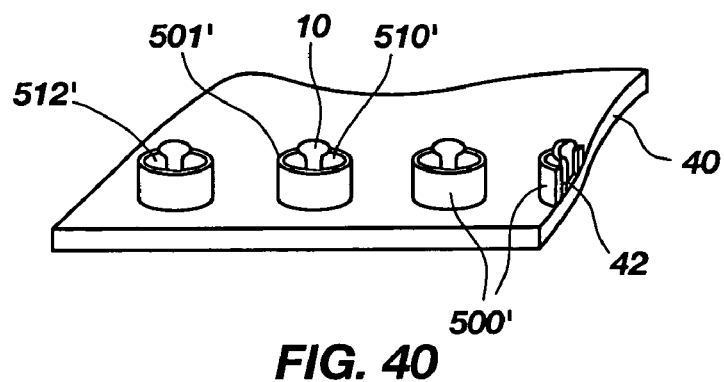
Figure 41:
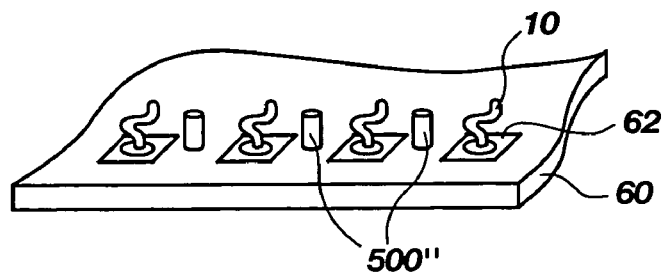

In another aspect, the present invention includes protective structures that are configured to prevent damage to a contact (e.g., contact 10, 10') of the present invention. FIGS. 39 through 41 depict exemplary embodiments of protective structures 500, 500', and 500", respectively, that incorporate teachings of the present invention.

The embodiment of protective structure 500 shown in FIG. 39 comprises a material layer 501 that is secured to a surface of a substrate, illustrated merely as an example as being a probe card 30. Contacts 10 may protrude a greater distance from a surface 32 of probe card 30 than the distance that layer 501 protrudes from surface 32. As shown, a plurality of receptacles 510 are formed in material layer 501, within which portions of contacts 10 are located. Surfaces 512 of each receptacle 510 may be spaced apart from the contact 10 therein so as to permit some compression or flexion of contact 10, while preventing contact 10 from being compressed or flexed beyond its elastic limit, which is largely dependent upon the material or materials from which contact 10 has been fabricated. The thickness of material layer 501 when subjected to compressive loading may also prevent each contact 10 from being compressed or flexed beyond its elastic limit.

Another exemplary embodiment of protective structure 500' is shown in FIG. 40. Each protective structure 500' is a cup-shaped structure that includes a wall 501' and a single receptacle 510' formed within the interior of wall 501'. As depicted, protective structure 500' is located on a surface of a substrate (a semiconductor device 40 in the depicted example), with receptacle 510' laterally surrounding at least a portion of a contact 10 that protrudes from a bond pad 42 of semiconductor device 40. As with protective structure 500, surfaces 512' of receptacle 510' may be spaced apart from the contact 10 therein so as to permit some compression or flexion of contact 10, while preventing contact 10 from being compressed or flexed beyond its elastic limit. The distance each protective structure 500' protrudes from the substrate when subjected to compressive loading may also prevent each contact 10 from being compressed or flexed beyond its elastic limit.

FIG. 41 illustrates yet another exemplary embodiment of protective structure 500". Each protective structure 500" comprises a post-like structure or other element which protrudes from a surface of a substrate, such as the depicted carrier substrate 60 (e.g., an interposer, circuit board, etc.) at a location which is adjacent to a terminal 62 of carrier substrate 60 and, thus, proximate to the location at which a contact 10 protrudes from carrier substrate 60. The heights of protective structures 500" are configured to prevent contacts 10 from being compressed or flexed under compressive forces beyond their elastic limits.

Each of the foregoing embodiments of protective structures 500, 500', 500", as well as other embodiments of protective structures that are within the scope of the present invention, may be fabricated by stereolithography processes, such as those described herein with reference to FIGS. 13A through 15. As such, a protective structure of the present invention may include a plurality of at least partially superimposed, contiguous, mutually adhered layers of material. All of the layers may be formed from the same material, or a variety of materials (e.g., materials with different degrees of compressibility or flexibility and resilience) may be used, depending at least in part upon the desired properties of the protective structure. Of course, other suitable techniques may also be used to form protective structures that incorporate teachings of the present invention.

Protective structures according to the present invention may be fabricated directly on a substrate, or fabricated separately from the substrate, then secured thereto (e.g., with a suitable adhesive material).

Although the foregoing description contains many specifics, these should not be construed as limiting the scope of the present invention, but merely as providing illustrations of some of the presently preferred embodiments. Similarly, other embodiments of the invention may be devised which do not depart from the spirit or scope of the present invention. Moreover, features from different embodiments of the invention may be employed in combination. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced thereby.

What is claimed:

1. A contact for a semiconductor device component, comprising:
    a core comprising a polymer and configured to protrude from the semiconductor device component in a generally transverse orientation relative to a plane of the semiconductor device component; and
    a conductive coating on at least a portion of the core.

2. The contact of claim 1, wherein the core is flexible and resilient.

3. The contact of claim 1, wherein the core is substantially rigid.

4. The contact of claim 1, wherein the core comprises a plurality of adjacent, mutually adhered regions of the polymer.

5. The contact of claim 1, wherein the polymer comprises a photoimagable polymer.

6. The contact of claim 1, wherein the core includes a base, an intermediate section, and a contact tip.

7. The contact of claim 6, wherein the intermediate section is flexible and resilient.

8. The contact of claim 6, wherein the base is configured to be secured to the semiconductor device component.

9. The contact of claim 6, wherein the conductive coating covers at least a portion of the contact tip and at least a portion of the intermediate section.

10. The contact of claim 9, wherein the conductive coating substantially covers the contact tip.

11. The contact of claim 9, wherein the contact tip is configured to electrically communicate with another contact of another semiconductor device component.

12. The contact of claim 9, wherein the conductive coating also covers at least a portion of the base.

13. The contact of claim 12, wherein a portion of the conductive coating on the base is configured to electrically communicate with a corresponding conductive element of the semiconductor device component.

14. The contact of claim 9, wherein the portion of the conductive coating on the intermediate section is configured to electrically communicate with a corresponding conductive element of the semiconductor device component.

15. The contact of claim 6, wherein the contact tip is enlarged relative to the intermediate section.

16. The contact of claim 1, wherein the conductive coating substantially covers the core.

17. The contact of claim 1, wherein the conductive coating comprises a plurality of layers of conductive material.

18. The contact of claim 1, wherein the core protrudes from a contact pad of the semiconductor device component.

19. The contact of claim 1, wherein the core comprises a filament.

20. A contact for a semiconductor device component, comprising:
    a core comprising a filament comprising dielectric material and configured to protrude from the semiconductor device component in a generally transverse orientation relative to a plane of the semiconductor device component; and
    a conductive coating on at least a portion of the core.

21. The contact of claim 20, wherein the core is flexible and resilient.

22. The contact of claim 20, wherein the core is substantially rigid.

23. The contact of claim 20, wherein the core comprises a plurality of adjacent, mutually adhered regions comprising the dielectric material.

24. The contact of claim 23, wherein the plurality of adjacent, mutually adhered regions comprises a plurality of at least partially superimposed, contiguous, mutually adhered layers.

25. The contact of claim 20, wherein the dielectric material comprises a polymer.

26. The contact of claim 25, wherein the polymer comprises a photoimagable polymer.

27. The contact of claim 20, wherein the core includes a base, an intermediate section, and a contact tip.

28. The contact of claim 27, wherein the intermediate section is flexible and resilient.

29. The contact of claim 27, wherein the base is configured to be secured to the semiconductor device component.

30. The contact of claim 27, wherein the conductive coating covers at least a portion of the contact tip and at least a portion of the intermediate section.

31. The contact of claim 30, wherein the conductive coating substantially covers the contact tip.

32. The contact of claim 31, wherein the contact tip is configured to electrically communicate with a contact of another semiconductor device component.

33. The contact of claim 30, wherein the conductive coating also covers at least a portion of the base.

34. The contact of claim 33, wherein a portion of the conductive coating on the base is configured to electrically communicate with a corresponding conductive element of the semiconductor device component.

35. The contact of claim 30, wherein the portion of the conductive coating on the intermediate section is configured to electrically communicate with a corresponding conductive element of the semiconductor device component.

36. The contact of claim 27, wherein the contact tip is enlarged relative to the intermediate section.

37. The contact of claim 20, wherein the conductive coating substantially covers the core.

38. The contact of claim 20, wherein the conductive coating comprises a plurality of contiguous regions of conductive material.

39. The contact of claim 38, wherein the plurality of contiguous regions comprises a plurality of layers.

40. The contact of claim 20, wherein the core is configured to protrude from a contact pad of the semiconductor device component.

41. A contact for a semiconductor device component, comprising:
 a core comprising a dielectric material configured to be secured to and protrude from a contact pad of the semiconductor device component; and
 a conductive coating on at least a portion of the core.

42. The contact of claim 41, wherein the core is flexible and resilient.

43. The contact of claim 41, wherein the core is substantially rigid.

44. The contact of claim 41, wherein the core comprises a plurality of adjacent, mutually adhered regions comprising the dielectric material.

45. The contact of claim 44, wherein the plurality of adjacent, mutually adhered regions comprises a plurality of at least partially superimposed, contiguous, mutually adhered layers.

46. The contact of claim 41, wherein the dielectric material comprises a polymer.

47. The contact of claim 46, wherein the polymer comprises a photoimagable polymer.

48. The contact of claim 41, wherein the core includes a base, an intermediate section, and a contact tip.

49. The contact of claim 48, wherein the intermediate section is flexible and resilient.

50. The contact of claim 48, wherein the base is configured to be secured to the semiconductor device component.

51. The contact of claim 48, wherein the conductive coating covers at least a portion of the contact tip and at least a portion of the intermediate section.

52. The contact of claim 51, wherein the conductive coating substantially covers the contact tip.

53. The contact of claim 52, wherein the contact tip is configured to electrically communicate with a contact of another semiconductor device component.

54. The contact of claim 51, wherein the conductive coating also covers at least a portion of the base.

55. The contact of claim 54, wherein a portion of the conductive coating on the base is configured to electrically communicate with a corresponding conductive element of the semiconductor device component.

56. The contact of claim 51, wherein the portion of the conductive coating on the intermediate section is configured to electrically communicate with a corresponding conductive element of the semiconductor device component.

57. The contact of claim 48, wherein the contact tip is enlarged relative to the intermediate section.

58. The contact of claim 41, wherein the conductive coating substantially covers the core.

59. The contact of claim 41, wherein the conductive coating comprises a plurality of contiguous regions of conductive material.

60. The contact of claim 59, wherein the plurality of contiguous regions comprises a plurality of layers.

* * * * *